(12) United States Patent
Blanchard et al.

(10) Patent No.: US 10,895,725 B2
(45) Date of Patent: Jan. 19, 2021

(54) CO-ALIGNING LATERALLY DISPLACED RADIATION BEAMS

(71) Applicant: BAE SYSTEMS PLC, London (GB)

(72) Inventors: Paul Michael Blanchard, Filton (GB); Craig Daniel Stacey, Filton (GB)

(73) Assignee: BAE Systems plc, London (GB)

( * ) Notice: Subject to any disclaimer, the term of this patent is extended or adjusted under 35 U.S.C. 154(b) by 282 days.

(21) Appl. No.: 16/081,137

(22) PCT Filed: Feb. 23, 2017

(86) PCT No.: PCT/GB2017/050462
§ 371 (c)(1),
(2) Date: Aug. 30, 2018

(87) PCT Pub. No.: WO2017/149275
PCT Pub. Date: Sep. 8, 2017

(65) Prior Publication Data
US 2019/0086653 A1   Mar. 21, 2019

(30) Foreign Application Priority Data

Mar. 2, 2016 (EP) .................................... 16250003
Mar. 2, 2016 (GB) .................................. 1603681.6

(51) Int. Cl.
G02B 19/00     (2006.01)
G02B 6/26      (2006.01)
(Continued)

(52) U.S. Cl.
CPC ......... *G02B 19/0057* (2013.01); *G02B 6/262* (2013.01); *G02B 6/2938* (2013.01);
(Continued)

(58) Field of Classification Search
CPC .. G02B 19/0057; G02B 6/262; G02B 6/2938; G02B 27/1006; G02B 27/1086; G02B 27/30
(Continued)

(56) References Cited

U.S. PATENT DOCUMENTS 5,195,103 A   3/1993  Hinton et al.
6,038,076 A   3/2000  Bouzid et al.
(Continued)

FOREIGN PATENT DOCUMENTS

CN   103346474 A    10/2013
WO   2015015168 A1   2/2015

OTHER PUBLICATIONS

PCT Search Report for Application No. PCT/GB2017/050462, dated May 8, 2017, 15 pages.
(Continued)

*Primary Examiner* — James R Greece
(74) *Attorney, Agent, or Firm* — Maine Cernota & Rardin

(57) ABSTRACT

Apparatus and method are disclosed for co-aligning laterally displaced radiation beams from respective radiation source outputs, each beam comprising a number of spectral components. The apparatus comprises a collimating element for receiving each of said radiation beams with respective lateral displacements and a combining element for receiving each of said radiation beams passed by said collimating element for co-aligning the radiation beams. The apparatus further comprises a diffraction assembly disposed in an optical path between the output of at least one radiation source and the collimating element, for spatially separating the radiation beam output by said at least one radiation source into the constituent spectral components of radiation prior to passing the radiation to the collimating element.

12 Claims, 3 Drawing Sheets

(51) Int. Cl.
  *G02B 27/10* (2006.01)
  *G02B 6/293* (2006.01)
  *G02B 27/30* (2006.01)

(52) U.S. Cl.
  CPC ..... *G02B 27/1006* (2013.01); *G02B 27/1086* (2013.01); *G02B 27/30* (2013.01); *G02B 6/29311* (2013.01); *G02B 6/29373* (2013.01)

(58) Field of Classification Search
  USPC .......................................................... 359/618
  See application file for complete search history.

(56) References Cited

U.S. PATENT DOCUMENTS

| | | | |
|---|---|---|---|
| 2002/0016536 A1* | 2/2002 | Benni | A61B 5/14553 600/323 |
| 2003/0234751 A1 | 12/2003 | Hwang | |
| 2009/0153968 A1* | 6/2009 | Goodno | G02B 19/0057 359/571 |
| 2009/0324170 A1 | 12/2009 | Cheung et al. | |
| 2010/0142022 A1 | 6/2010 | Sjostrom | |
| 2014/0363338 A1 | 12/2014 | Sukegawa et al. | |
| 2015/0338640 A1 | 11/2015 | Stacey et al. | |

OTHER PUBLICATIONS

European Search Report for Application No. 16250003.7-1562, dated Nov. 22, 2016, 8 pages.
Great Britain Search Report for Application No. GB1603681.6, dated Oct. 27, 2016, 4 pages.

* cited by examiner

CO-ALIGNING LATERALLY DISPLACED RADIATION BEAMS

RELATED APPLICATIONS

This application is a national phase application filed under 35 USC § 371 of PCT Application No. PCT/GB2017/050462 with an International filing date of Feb. 23, 2017, which claims priority of GB Patent Application 1603681.6 filed on Mar. 2, 2016 and EP Patent Application 16250003.7 filed on Mar. 2, 2016. Each of these applications is herein incorporated by reference in its entirety for all purposes.

FIELD OF THE INVENTION

The present invention relates to an apparatus and method for co-aligning laterally displaced radiation beams.

BACKGROUND OF THE INVENTION

There are a number of methods for combining laser beams and specifically to combine a number of laser beams each having a different wavelength. The principal approaches include (a) the use of dichroic mirrors and (b) spectral beam combining (SBC). The former method employs a mirror which is designed to transmit a certain wavelength (or band of wavelengths) and reflect a different wavelength (or band of wavelengths). The limitation with this approach is the requirement to scale the number of dichroic mirrors with the number of laser wavelengths. This results in an increased complexity in terms of alignment and cost, in addition to approaching physical limitations if the total band of wavelengths spans multiple octaves.

SBC offers a method of employing a single set of elements to combine a number of wavelengths (within the constraints of the numerical aperture and spectral pass-band of optical elements). The method is based on having an array of laterally displaced laser radiation sources, with the laser beam output from each source diverging onto a lens, followed by a dispersive element. The lens converts lateral separation of the laser beams into angular separation. Accordingly, by designing the laser beams to have appropriate wavelengths, the dispersive element then deflects each laser beam (and thus the constituent laser beam wavelengths) by an amount proportional to the wavelength, thereby causing angular re-alignment of each laser beam and hence a single (but spectrally composite) beam to be realised. Most applications employing this technique are aimed at power-scaling of lasers, thus allowing a single laser beam to be created with a power much higher than would be permitted by a single laser. Each laser is designed to generate a laser beam having a slightly different wavelength, but the spectral separation is typically only of the order of nanometres, since it is usually desirable to have a narrow band of wavelengths, so that the laser beam generated is substantially quasi-monochromatic.

In the majority of instances where SBC is employed, the dispersive element is a diffraction grating. Diffraction gratings are used as they offer comparatively high spectral dispersion, thus allowing closely spaced wavelengths to be combined, although only a limited spectral bandwidth may be accommodated before overlap of diffraction orders becomes a problem. An alternative dispersive element to the diffraction grating is a prism. Such a device performs the same function, exhibiting much lower spectral dispersion, but offering a much wider spectral bandwidth.

However, the principle of SBC places an intrinsic limitation on the spectral properties of the laser beams to be combined. A laser radiation source generating a laser beam with a particular wavelength (or spread of wavelengths owing to the linewidth thereof) will have a unique lateral position in the array for the particular lens and dispersive element. This is because lateral offset in the array is converted into angular offset, namely an angular re-alignment, following the collimating lens, which is in turn, deflected by the dispersive optical element by an amount dependent on the wavelength. Accordingly, in order to achieve co-alignment of all emerging beams from the dispersive element, each laser radiation source has its position in the array determined by the lens focal length and properties of the dispersive element (angle of incidence and wedge angle), in addition to the wavelength of the laser beam generated from the source.

The limitation referred to is the linewidth of a laser beam generated by a given laser radiation source. It has been determined that the maximum linewidth permissible by each laser beam must typically be of the order of 10-15 nm for wavelengths between 532 nm and 4075 nm. For laser radiation sources generating laser beams with a greater linewidth, then the spread of wavelengths would lead to wavelength components of the laser beam outside the permissible linewidth, becoming misaligned with the wavelength components within the permissible linewidth. Therefore, it is first necessary to first spectrally separate a laser beam having a broad range of wavelengths (large linewidth) into individual beams (each having different wavelengths) having the desired linewidth, before coupling them into the desired lateral position in the array for subsequent combination. Clearly, as the laser beam linewidth becomes broader then it would be necessary to split the laser beam into an increasing number of beams.

However, spectrally separating a broad linewidth laser beam into the spectral components is a lossy process. Moreover, each spectrally separated laser beam would then need to be coupled into a separate waveguide for suitably locating the laser beams at the correct lateral separation with respect to the collimating lens. This coupling presents a further energy loss. Furthermore, this de-multiplexing approach would likely lead to spectral gaps in the resulting combined laser beam and thus a further loss of potentially useful energy.

SUMMARY OF THE INVENTION

According to a first aspect of the invention, there is provided apparatus for co-aligning laterally displaced radiation beams from respective radiation source outputs, each beam comprising a number of spectral components, the apparatus comprising:

a collimating element for receiving each of said radiation beams with respective lateral displacements; and, a combining element for receiving each of said radiation beams passed by said collimating element for co-aligning the radiation beams; the apparatus further comprising:

an optical assembly disposed in an optical path between the output of at least one radiation source and the collimating element, for spatially separating the radiation beam output by said at least one radiation source into the constituent spectral components of radiation prior to passing the radiation to the collimating element.

In an embodiment, the optical assembly comprises a first optical element and a second optical element. Preferably, the first and second optical elements comprise substantially the same optical elements having substantially the same optical characteristics.

In an embodiment, the first and second optical elements comprise diffraction gratings and may further comprise blazed gratings. In an alternative embodiment, the optical elements comprise optical prisms.

The limited physical separation between the radiation source outputs, and between the radiation sources and the collimating element imposes an upper limit on the physical size of the optical assembly, since if the assembly is too large, then the assembly will interfere, for example block, radiation beams from neighbouring radiation source outputs. However, if the assembly is too small, then there is a risk that the assembly may not capture all of the constituent spectral components of the radiation from the at least one source. Accordingly, in an embodiment, the apparatus further comprises a radiation conditioning element disposed in the optical path between the at least one radiation source and the optical assembly for reducing a divergence of the radiation beam incident on the assembly. The radiation conditioning element may comprise a ball lens, for example.

In an embodiment, the apparatus further comprises a further optical element disposed in the optical path between the optical assembly and the collimating element, for causing the radiation incident thereon to diverge so that the radiation becomes suitably collimated by the collimating element. In an embodiment, the further optical element, such as a plano-concave lens, for example. In an embodiment, the further optical element is positioned such that a focal point of the further optical element is located at substantially the same location as a focal point of the collimating element.

In an embodiment, the apparatus further comprises a radiation source mount for positioning the radiation source outputs relative to the collimating element.

In an embodiment, the collimating element comprises a lens or lens arrangement, and the combining element comprises a dispersive element, such as a prism or diffraction grating.

According to a second aspect of the present invention, there is provided a method of co-aligning laterally displaced radiation beams from respective radiation source outputs, each beam comprising a number of spectral components, the method comprising the steps of:

collimating the radiation beam output from each radiation source at a collimating element;
spatially separating the spectral components of the radiation beam output by at least one radiation source into the constituent spectral components prior to collimating the spectrally separated components;
combining the collimated radiation beams and the spectrally separated components at a combining element such that the radiation beams passed by the combining element become co-aligned.

In an embodiment, the method comprises spatially separating the spectral components of the radiation beam output by the at least one radiation source at an optical assembly disposed in an optical path between the output of at least one radiation source and the collimating element.

In an embodiment, the method comprises spatially separating the radiation beams into the respective spectral components in dependence on a linewidth of the respective laser beam. The method may further comprise spatially separating the radiation beams into the respective spectral components if the linewidth exceeds a predefined range, such as 10-15 nm for a laser beam having a wavelength in the range 532 nm-4075 nm.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

DETAILED DESCRIPTION

Figure 1:
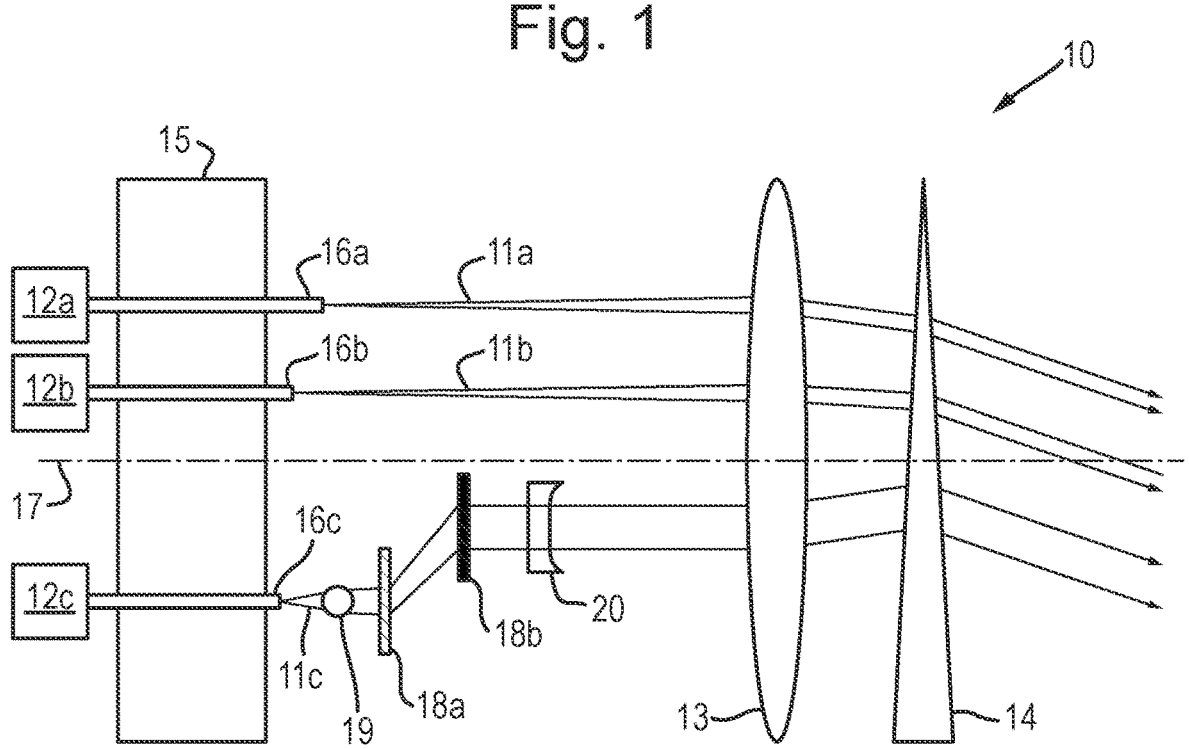
FIG. 1 is schematic illustration of an apparatus for co-aligning a plurality of laterally displaced radiation beams, according to an embodiment of the present invention.

Referring to the FIG. 1 of the drawings, there is illustrated apparatus 10 according to an embodiment of the present invention for co-aligning laterally displaced radiation beams 11 output from respective radiation source 12a-c. The radiation sources 12a-c, such as laser sources are arranged to generate radiation beams 11a-c, such as laser beams, and these beams 11a-c will comprise an inherent linewidth comprising a plurality of spectral components. The linewidth may be relatively narrow such that the laser beam 11a, 11b may be deemed monochromatic, namely comprising a substantially single wavelength of radiation, or relatively wide, such that the laser beam 11c may comprise a broadband or broad range of wavelengths. For the purpose of illustration it will be assumed that the radiation source 12c generates a broadband radiation beam 11c, whereas each of the other radiations sources 12a, 12b generate a substantially monochromatic radiation beam 11a, 11b. However, it is to be appreciated that the apparatus 10 may comprise further broadband radiation sources.

The apparatus 10 comprises a collimator element 13, such as a lens or lens arrangement, which is arranged to receive the radiation beams 11 from the radiation sources 12, and a combining element 14, which may comprise a diffraction grating or prism for example, for combining the collimated beams 11 incident thereon from the collimator element 13.

The apparatus 10 further comprises a radiation source mount 15 for supporting the output of each radiation source 12 in spaced relation to the collimator element 13. The mount 15 comprises a plurality of V-shaped channels (not shown) formed in an upper surface thereof for example, which are arranged to separately support a waveguide 16a-c. The waveguides 16a-c may comprise optical fibres for example, and are separately arranged to guide radiation from a respective radiation source 12a-c to an output thereof. Each channel (not shown) is arranged to extend substantially parallel to the optical axis 17 of the collimator element 13 and the lateral separation of the channels (not shown) from the optical axis 17 is selected in dependence of the particular wavelength of radiation that the waveguide 16a-c is arranged to guide, in combination with the particular arrangement of collimator element 13 and combining element 14.

In the illustrated embodiment, the apparatus 10 further comprises an optical assembly 18 located in the optical path between an output face of the waveguide 16c supporting radiation from the broadband radiation source 12c and the collimating element 13. However, it is to be appreciated that the apparatus 10 may comprise further assemblies 18 for separately receiving the radiation beam output by further broadband radiation sources. The optical assembly 18 illustrated in FIG. 1 is arranged to receive the radiation output from the broadband waveguide 16c and comprises a first and second optical element 18a, 18b which comprise substantially the same optical properties, such that effects of one element 18a becomes reciprocated by the other element 18b to negate any geometric distortion, for example. The first and second optical elements 18a, 18b may comprise a first and second prism or a first and second diffraction grating (reflective or transmissive gratings), for example.

The first optical element 18a is arranged to disperse the radiation beam 11c incident thereon to spatially separate the spectral components of the beam 11c, such that the radiation propagating from the first element 18a becomes angularly deflected by an amount dependent on the wavelength of the spectral component. The second optical element 18b is positioned to receive the radiation passed by the first element 18a and is orientated relative to the first element 18a so that the angularly separated components undergo an opposite refraction and diffraction. In this respect, the original single but spectrally composite beam 11c incident upon the first element 18a propagates from the optical assembly 18 as a spatially separated array of beams. With suitable longitudinal and lateral separation between the first and second elements 18a, 18b, the lateral separation of the array of beams emerging from the second element 18b can be tailored to match the required lateral separation for combining using the collimating and combining elements 13, 14 of the apparatus 10.

In an embodiment in which the optical elements 18a, 18b comprise diffraction gratings, the radiation beam incident thereon becomes diffracted in a number of separate diffraction orders, denoted by the integer variable "m". The first grating 18a is arranged to diffract the radiation beam 16c into orders "m" for example, while the second grating 18b is arranged to diffract the radiation into orders "−m". The diffraction into a particular order, such as the first order, can be optimised by using a blazed grating, for example. With suitable longitudinal separation between the first and second gratings 18a, 18b, the transmitted radiation will continue to propagate, but separated into its spectral components, each component being parallel and at the correct lateral separation, as required by the collimating and combining element 13, 14 combination.

The apparatus 10 further comprises a radiation conditioning element 19, such as a ball lens, disposed in the optical path between the broadband radiation source 12c and the optical assembly 18, for reducing a divergence of the radiation beam incident on the assembly 18. It is found that the limited space between the output face of the waveguides 16a-c and the collimating lens 13 creates an upper limit to the permissible size of the optical assembly 18. The optical elements 18a, 18b (whether prisms or gratings) will need to be small enough to avoid interference with the diverging beams 11a-c from neighbouring waveguides 16a-c, but large enough to fully transmit (without clipping) the intended radiation beam. The conditioning element 19 is arranged to reduce the divergence of the radiation beam 11c from the waveguide 16c prior to transmission by the assembly 18. The conditioning element 19 may be located at a distance from the output of the waveguide 16c such that the emerging radiation is collimated (or at least reduced in divergence compared to having no lens). The reduced divergence imposed by the conditioning element 19 however, may affect the subsequent collimation by the collimating lens 13 with the result that the spatially separated components of the radiation beam 11c do not accurately combine with the radiation beam 11a, 11b output from the other radiation sources 12a, 12b. Therefore, in an embodiment, the apparatus 10 may further comprise a further optical element 20, such as a plano-concave lens for example, disposed in the optical path between the assembly 18 and the collimating element 13, such that a focal point of the plano-concave lens is located at substantially the same location as a focal point of the collimating element 13. The further optical element 20 is arranged to cause the radiation incident thereon to diverge so that the radiation subsequently becomes suitably collimated by the collimating element 13.

Figure 2:
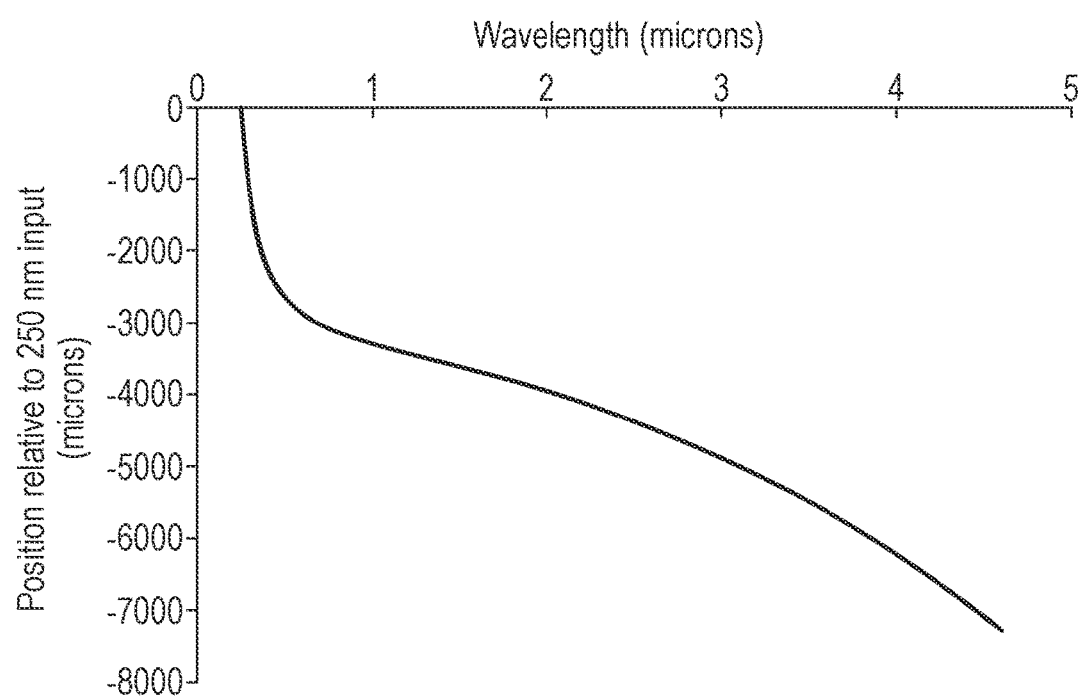
FIG. 2 is a graphical representation illustrating the physical lateral separations required between the input waveguides, relative to a 250 nm wavelength radiation beam.
Figure 3A:
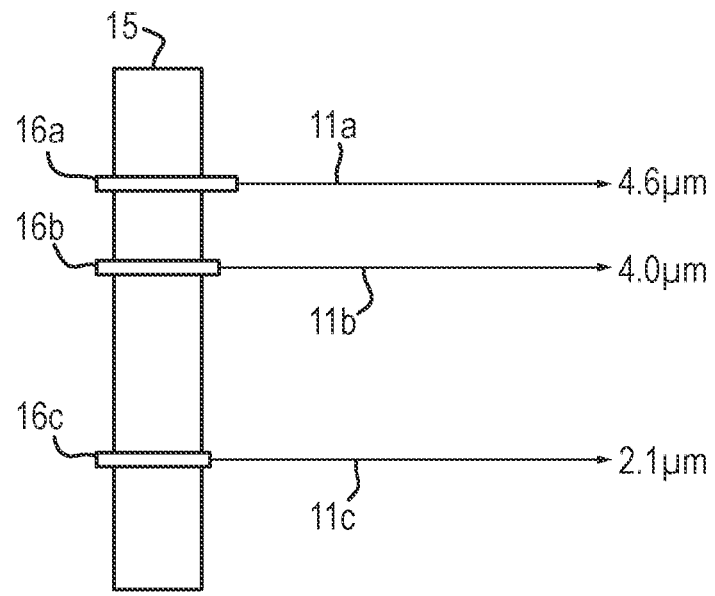
FIG. 3a is a schematic illustration of the relative lateral separation of the waveguides upon the mount for combining using a collimating and combining element combination.
Figure 3B:
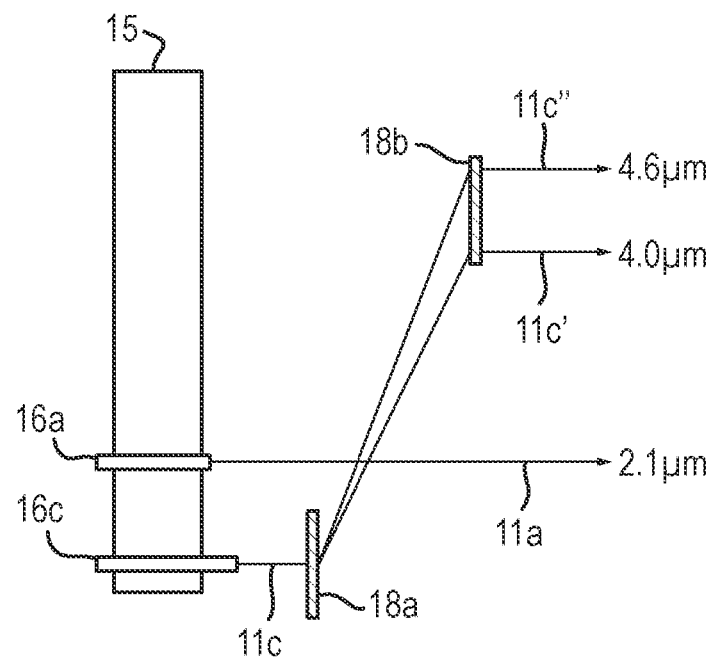
FIG. 3b is a schematic illustration of the relative lateral separation of the waveguides upon the mount, using a first and second diffraction grating for combining using a collimating and combining element combination.
Figure 4:
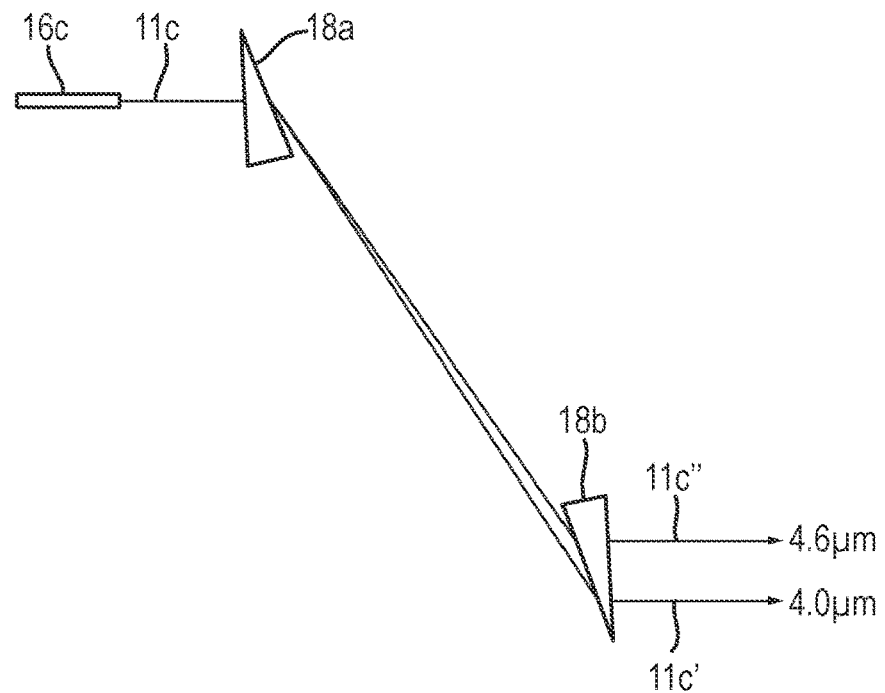
FIG. 4 is a schematic illustration of the spatial separation of the spectral components of a radiation beam using a first and second prism.

Referring to FIGS. 2-4 of the drawings, in a specific embodiment of the invention, the apparatus 10 may be used to co-align two radiation beams 11a, 11c—a first (11a) comprising a substantially monochromatic beam having a wavelength of 2.1 μm, and a second (11c) comprising a range of wavelengths (namely a linewidth) spanning from 4.0 μm to 4.6 μm, for example. The collimating and combining elements 13, 14 of the over-arching spectral beam combiner dictate the required lateral separation between the input waveguides 16a, 16c to generate a single, spectrally composite beam. FIG. 2 of the drawings illustrates the lateral separations required between the waveguides 16a, 16c on the mount 15, relative to a 250 nm wavelength radiation beam. It is apparent that the separations are non-linear with wavelength and the profile precisely follows the form of the dispersion curve of the prism material (sapphire in this case). At wavelengths around 4 μm a change in wavelength of 0.1 μm requires a change in waveguide position of around 174 μm for example, which substantially corresponds with an outer diameter of conventional optical fibre.

In the event that the three principal wavelengths, namely 2.1 μm, 4.0 μm and 4.6 μm were generated as separate beams 11a-c from separate waveguides 16a-c, then the three waveguides 16a-c would need to be laterally separated upon the mount 15 as is illustrated in FIG. 3a of the drawings (in which the collimating and combining elements 13, 14 are removed for clarity). This separation of three waveguides 16a-c from an optical axis 17 of the collimating element 13 is required in order to generate a single, spectrally composite radiation beam from the combining element 14.

In contrast, FIG. 3b of the drawings illustrates how the lateral positions of each radiation beam 11a-c can be realised by using only the two input waveguides 16a, 16c and two diffraction gratings 18a, 18b. By laterally offsetting the position of the broadband waveguide 16c relative to the waveguide 16a supporting the 2.1 μm radiation, the resulting 4.0 μm and 4.6 μm radiation beams 11c', 11c" emerge from the second diffraction grating at the correct lateral positions relative to the 2.1 μm radiation beam 11a. Moreover, all wavelengths within the 4.0 μm to 4.6 μm band will all similarly be aligned to each other.

The first and second diffraction gratings 18a, 18b are manufactured from a suitable material which transmits the 4.0 μm and 4.6 μm wavelength radiation beams 11c', 11c", and are located between an output face of the broadband waveguide 16c and the collimating element 13. Each grating 18a, 18b has a period of 5882 nm and the second grating 18b is longitudinally separated along the optical axis 17 from the first grating 18a by 3.04 mm, and is laterally offset to account for the angle of the first diffraction order. The positions are such that the 2.1 μm waveguide 16a and the radiation beam 11a emerging from the 2.1 μm waveguide 16a are both unaffected (i.e. no mechanical or optical interference occurs) by the first or second gratings 18a, 18b.

This is a specific numerical example. The spectral performance of a device based on this approach is clearly limited by the total number and position of radiation beams required for which the over-arching collimating and combining element 13, 14 combination has been designed. In this example, the position of the broadband waveguide 16c lies 126 μm to the side (below in FIG. 3b) of the input waveguide 16a transmitting 2.1 μm.

In a further embodiment, as illustrated in FIG. 4 of the drawings, the same concept can be realised using a first and second prism 18a, 18b instead of diffraction gratings. FIG. 4 illustrates the lateral separation achieved between the 4.0 μm and 4.6 μm spectral components 11c', 11c" of the radiation beam 11c propagating from the broadband waveguide 16c. In this embodiment, sapphire prisms 18a, 18b, each with a 33° wedge angle are employed. The angle of incidence on the first prism 18a is 2.3° while the second prism 18b is oriented such that the angle of incidence of each beam 11c', 11c" is the same as the angle of exitance of each beam 11c', 11c" from an exit face of the first prism 18a. The prisms 18a, 18b are separated longitudinally (in the direction of the optical axis 17) by 8 mm and laterally by 5 mm.

Figure 5:
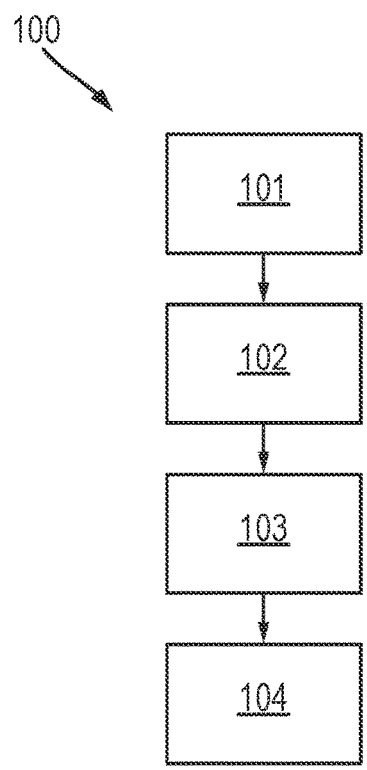
FIG. 5 is a flow chart illustrating the steps associated with a method of co-aligning a plurality of laterally displaced radiation beams, according to an embodiment of the present invention.

Referring to FIG. 5 of the drawings, there is illustrated a flowchart outlining the steps associated with a method 100 according to the present invention, of co-aligning a number of laterally displaced radiation beams 11a-c from respective radiation source outputs 12a-c, each beam 11a-c comprising a number of spectral components. The method 100 comprises collimating the radiation beam 11a-c output from each radiation source 12a-c at the collimating element 13 at step 101 and spatially separating the spectral components of the radiation beam 11c output by at least one radiation source 12c into the constituent spectral components at step 102, prior to collimating the spectrally separated components. The method further comprises combining the collimated radiation beams and the spectrally separated components at a combining element 13 at step 103, such that the radiation beams 11a-c passed by the combining element 14 become co-aligned.

The method enables a broadband radiation beam 11c to be suitably combined with other radiation beams 11a, 11b by spatially separating the spectral components of the broadband radiation beam 11c at an optical assembly 18 located in the optical path between the broadband source 12c and the collimating element 13. In this respect, the method may comprise the additional step of analysing the linewidth of a radiation beam 11 output from a respective source 12 at step 104 using a spectrum analyser (not shown) for example, to ascertain whether the spectral components of a radiation beam 11 require spatial separation, prior to undergoing combining using the collimating and combining element 13, 14 combination.

From the foregoing therefore it is evident that the apparatus and method of the present invention provide for an improved alignment of laterally displaced radiation beams.

What is claimed is:

1. Apparatus for co-aligning laterally displaced optical radiation beams from at least a first radiation source output and a second radiation source output, each beam comprising a number of spectral components, the apparatus comprising:
   a collimating element for receiving each of said radiation beams with respective lateral displacements; and,
   a combining element for receiving each of said radiation beams passed by said collimating element for co-aligning the radiation beams; the apparatus further comprising:
   an optical assembly comprising adjacent first and second optical elements, disposed, in respect of the first radiation source output and the second radiation source output, only in an optical path between the second radiation source output and the collimating element, for spatially separating a plurality of spectral components having different wavelengths by the second radiation source output into the constituent spectral components of radiation prior to passing the radiation to the collimating element,
   wherein the adjacent first and second optical elements comprise substantially the same optical elements having substantially the same optical characteristics.

2. The apparatus according to claim 1, wherein the first and second optical elements comprise diffraction gratings.

3. The apparatus according to claim 1, wherein the adjacent first and second optical elements comprise optical prisms.

4. The apparatus according to claim 1, further comprising a radiation conditioning element disposed in the optical path between at least one radiation source and the optical assembly for reducing a divergence of the radiation beam incident on the assembly.

5. The apparatus according to claim 4, wherein the radiation conditioning element comprises a ball lens.

6. The apparatus according to claim 1, comprising a further optical element disposed in the optical path between the optical assembly and the collimating element, for causing the radiation incident thereon to diverge so that the radiation becomes suitably collimated by the collimating element.

7. The apparatus according to claim 6, wherein the further optical element is positioned such that a focal point of the further optical element is located at substantially the same location as a focal point of the collimating element.

8. The apparatus according to claim 1, further comprising a radiation source mount for positioning the first radiation source output and the second radiation source output relative to the collimating element.

9. The apparatus according to claim 1, wherein the combining element comprises a dispersive element.

10. A method of co-aligning laterally displaced optical radiation beams from respective first radiation source output and second radiation source output, each beam comprising a number of spectral components, the method comprising the steps of:
   collimating the radiation beam output from each radiation source at a collimating element;
   spatially separating the spectral components of the radiation beam output by the second radiation output at an optical assembly comprising adjacent first and second optical elements disposed, in respect of the first radiation source output and the second radiation source output, only in an optical path between the output of the second radiation source and the collimating element, into the constituent spectral components prior to collimating the spectrally separated components;
   combining the collimated radiation beams and the spectrally separated components at a combining element such that the radiation beams passed by the combining element become co-aligned;
   wherein the adjacent first and second optical elements comprise substantially the same optical elements having substantially the same optical characteristics.

11. The method according to claim 10, further comprising spatially separating the radiation beams into the respective spectral components in dependence on a linewidth of the respective laser beam.

12. The method according to claim 11, further comprising spatially separating the radiation beams into the respective spectral components if a linewidth of the radiation beam exceeds a predefined range.

* * * * *